(12) United States Patent
Liu et al.

(10) Patent No.: US 9,076,473 B1
(45) Date of Patent: Jul. 7, 2015

(54) DATA STORAGE DEVICE DETECTING FLY HEIGHT INSTABILITY OF HEAD DURING LOAD OPERATION BASED ON MICROACTUATOR RESPONSE

(71) Applicant: Western Digital Technologies, Inc., Irvine, CA (US)

(72) Inventors: Yanning Liu, San Ramon, CA (US); Xin Wang, San Jose, CA (US); Jianghong Ding, Ladera Ranch, CA (US); Dean V. Dang, Fountain Valley, CA (US); Jong Hyun Lee, Los Angeles, CA (US); Duc T. Phan, Saratoga, CA (US); Timothy A. Ferris, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/457,425

(22) Filed: Aug. 12, 2014

(51) Int. Cl.
| | |
|---|---|
| *G11B 21/02* | (2006.01) |
| *G11B 27/36* | (2006.01) |
| *G11B 5/60* | (2006.01) |
| *G11B 5/54* | (2006.01) |

(52) U.S. Cl.
CPC .............. *G11B 5/6011* (2013.01); *G11B 5/54* (2013.01); *G11B 5/6076* (2013.01); *G11B 5/6058* (2013.01)

(58) Field of Classification Search
None
See application file for complete search history.

(56) References Cited

U.S. PATENT DOCUMENTS

| | | | |
|---|---|---|---|
| 6,014,283 | A | 1/2000 | Codilian et al. |
| 6,052,076 | A | 4/2000 | Patton, III et al. |
| 6,052,250 | A | 4/2000 | Golowka et al. |
| 6,067,206 | A | 5/2000 | Hull et al. |
| 6,078,453 | A | 6/2000 | Dziallo et al. |
| 6,091,564 | A | 7/2000 | Codilian et al. |
| 6,094,020 | A | 7/2000 | Goretzki et al. |
| 6,101,065 | A | 8/2000 | Alfred et al. |
| 6,104,153 | A | 8/2000 | Codilian et al. |
| 6,122,133 | A | 9/2000 | Nazarian et al. |
| 6,122,135 | A | 9/2000 | Stich |
| 6,141,175 | A | 10/2000 | Nazarian et al. |
| 6,160,368 | A | 12/2000 | Plutowski |
| 6,181,502 | B1 | 1/2001 | Hussein et al. |
| 6,195,222 | B1 | 2/2001 | Heminger et al. |
| 6,198,584 | B1 | 3/2001 | Codilian et al. |
| 6,198,590 | B1 | 3/2001 | Codilian et al. |
| 6,204,988 | B1 | 3/2001 | Codilian et al. |
| 6,243,223 | B1 | 6/2001 | Elliott et al. |
| 6,281,652 | B1 | 8/2001 | Ryan et al. |
| 6,285,521 | B1 | 9/2001 | Hussein |
| 6,292,320 | B1 | 9/2001 | Mason et al. |
| 6,293,135 | B1 | 9/2001 | Marchon et al. |

(Continued)

OTHER PUBLICATIONS

Imai, S., Burger, G. J., Lammerink, T. S. J., & Fluitman, J. H. J. "Output characteristics of a thin-film piezoelectric AE sensor for magnetic head-disk interaction" JSME International Journal, 1997, Series C, vol. 40, No. 1, 33-41.

(Continued)

*Primary Examiner* — Andrew L Sniezek

(57) ABSTRACT

A data storage device is disclosed comprising a first disk surface, a first head, and a first microactuator configured to actuate the first head over the first disk surface. The first microactuator is configured into a first sensor, and a first load operation is executed to load the first head over the first disk surface. A fly height instability of the first head is detected during the first load operation based on a first sensor signal generated by the first microactuator.

34 Claims, 6 Drawing Sheets

(56) References Cited

U.S. PATENT DOCUMENTS

| | | |
|---|---|---|
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,363,214 B1 | 3/2002 | Merello et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,490,116 B1 | 12/2002 | Watanabe et al. |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,512,650 B1 | 1/2003 | Tanner |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,563,660 B1 | 5/2003 | Hirano et al. |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,643,088 B1 | 11/2003 | Kawachi |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,822,821 B2 | 11/2004 | Gan et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,659 B2 | 6/2006 | Baumgartner et al. |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,072,135 B2 | 7/2006 | Suzuki |
| 7,088,547 B1 | 8/2006 | Wang et al. |
| 7,095,579 B1 | 8/2006 | Ryan et al. |
| 7,110,207 B2 | 9/2006 | Hirano et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,121,133 B2 | 10/2006 | Chu et al. |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,190,547 B2 | 3/2007 | Khurshudov et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,274,529 B2 | 9/2007 | Ho et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,312,941 B2 | 12/2007 | Hirano et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |

(56) References Cited

U.S. PATENT DOCUMENTS

| | | | |
|---|---|---|---|
| 7,391,584 B1 | 6/2008 | Sheh et al. |
| 7,391,586 B2 | 6/2008 | Keast |
| 7,397,421 B2 | 7/2008 | Smith |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,660 B2 | 11/2008 | Tanner |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,112 B2 | 1/2009 | Tanner |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,194 B2 | 3/2009 | Alexander et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,742,255 B2 | 6/2010 | Daugela et al. |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,891,080 B2 * | 2/2011 | Alexander et al. ......... 29/603.09 |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,924,526 B1 | 4/2011 | Chui et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,144,419 B1 * | 3/2012 | Liu .................................... 360/75 |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,499,652 B1 | 8/2013 | Tran et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B1 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,755,136 B1 | 6/2014 | Ng et al. |

(56) References Cited

U.S. PATENT DOCUMENTS

| | | |
|---|---|---|
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,786,976 B1 | 7/2014 | Kang et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,810,955 B1 * | 8/2014 | Song et al. ................... 360/75 |
| 8,824,081 B1 | 9/2014 | Guo et al. |
| 8,824,262 B1 | 9/2014 | Liu et al. |
| 2003/0002183 A1 | 1/2003 | Fioravanti |
| 2005/0007688 A1 | 1/2005 | Chang et al. |
| 2008/0259480 A1 | 10/2008 | Pham et al. |
| 2010/0035085 A1 | 2/2010 | Jung et al. |
| 2010/0309574 A1 | 12/2010 | Bahirat et al. |
| 2011/0157736 A1 | 6/2011 | Contreras et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

OTHER PUBLICATIONS

James McFadyen, U.S. Appl. No. 13/796,317, filed Mar. 12, 2013, 20 pages.

Jifang Tian, et al., U.S. Appl. No. 14/303,955, filed Jun. 13, 2014, 34 pages.

Alain Chahwan, U.S. Appl. No. 14/310,944, filed Jun. 20, 2014, 27 pages.

* cited by examiner

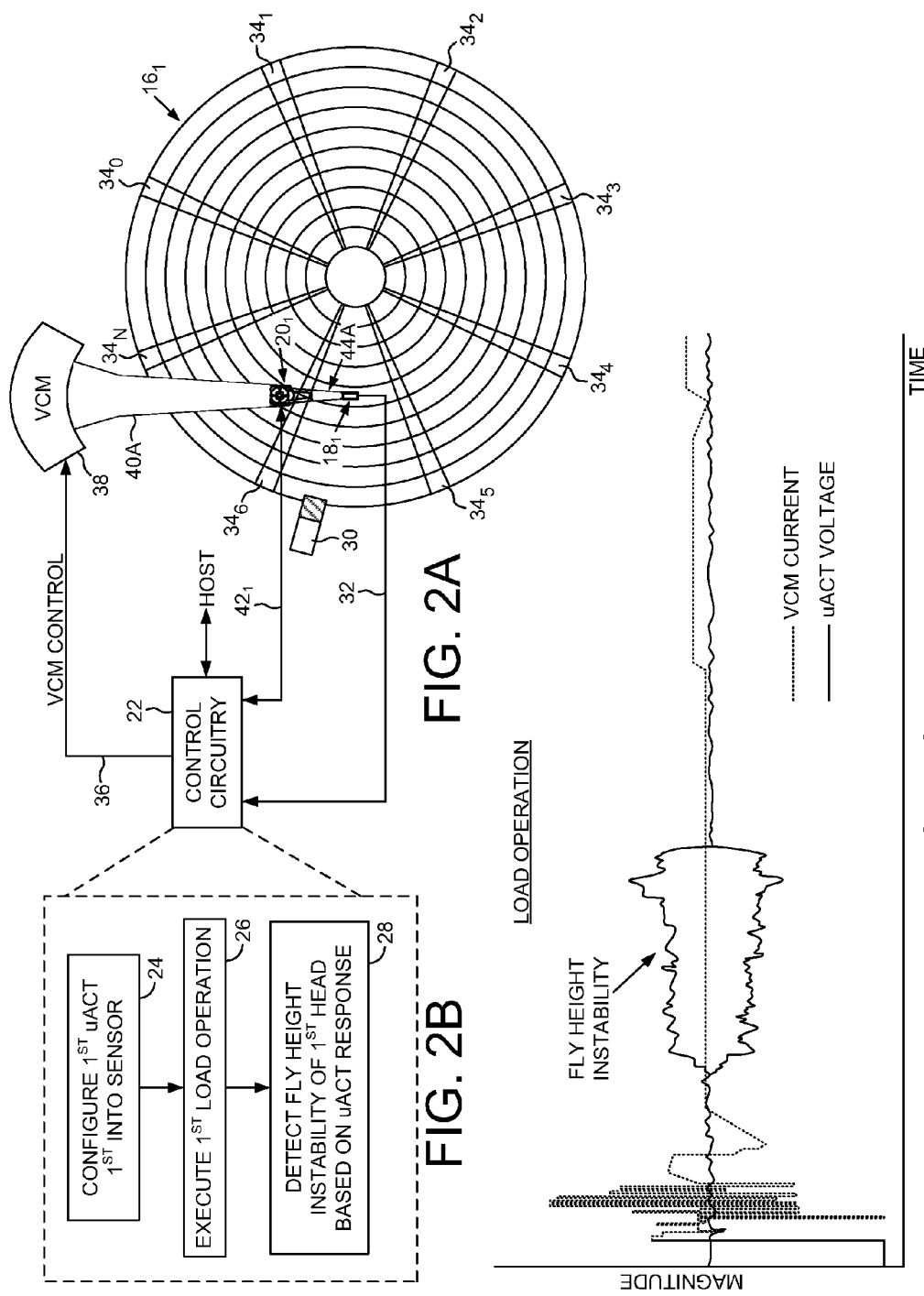

DATA STORAGE DEVICE DETECTING FLY HEIGHT INSTABILITY OF HEAD DURING LOAD OPERATION BASED ON MICROACTUATOR RESPONSE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor and/or a microactuator) in order to actuate the head radially over the disk in a direction that reduces the PES.

When the disk drive is powered off or enters an idle mode, the head is unloaded onto a ramp mounted over an outer edge of the disk before spinning down the disk. When the disk is powered on or exits the idle mode, the disk is spun up to an operating speed and the head is launched from the ramp over the spinning disk surface during a load operation.

BRIEF DESCRIPTION OF THE DRAWINGS

FIG. 2A shows a data storage device in the form of a disk drive according to an embodiment comprising a head actuated over a disk surface by a voice coil motor (VCM) and a microactuator.

FIG. 2B is a flow diagram according to an embodiment wherein the microactuator is configured into a sensor and monitored during a load operation in order to detect fly height instability of the head.

FIG. 2C is a waveform of the microactuator sensor signal illustrating fly height instability during a load operation.

DETAILED DESCRIPTION

Figure 1:
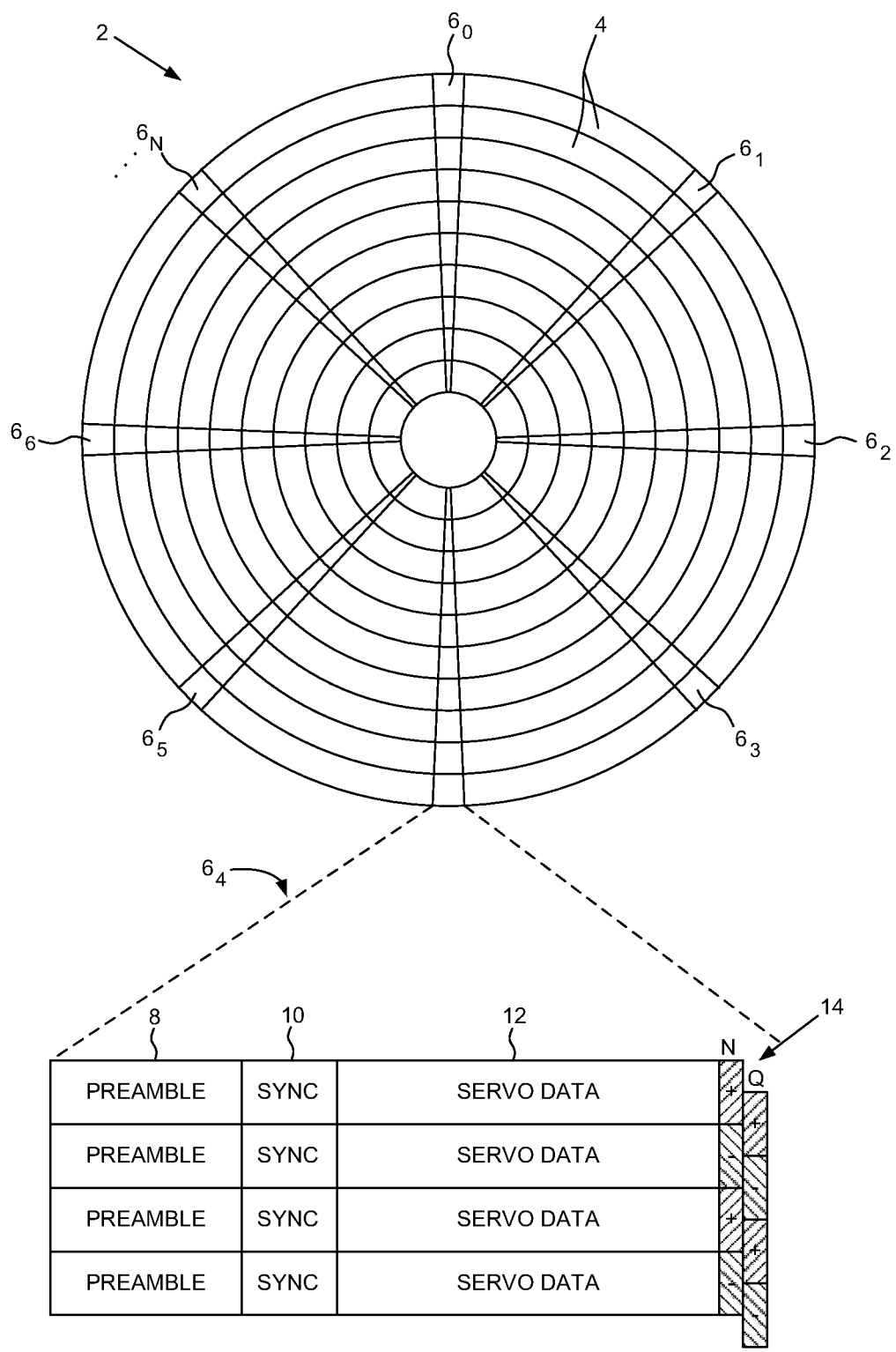
FIG. 1 shows a prior art disk format comprising a plurality of servo tracks defined by servo sectors.

FIG. 2A shows a data storage device in the form of a disk drive according to an embodiment comprising a first disk surface $16_1$, a first head $18_1$, and a first microactuator $20_1$ configured to actuate the first head $18_1$ over the first disk surface $16_1$. The disk drive further comprises control circuitry 22 configured to execute the flow diagram of FIG. 2B, wherein the first microactuator $20_1$ is configured into a first sensor (block 24), and a first load operation is executed to load the first head over the first disk surface (block 26). A fly height instability of the first head is detected during the first load operation based on a first sensor signal generated by the first microactuator (block 28).

In the embodiment of FIG. 2A, the disk drive comprises a ramp 30 mounted over the outer edge of the first disk surface $16_1$ wherein the first head $18_1$ is unloaded onto the ramp 30 when the first disk surface $16_1$ is spun down (e.g., at power off or idle mode). When the disk drive is powered on or exiting an idle mode, the first disk surface $16_1$ is spun up to an operating speed, and the first head $18_1$ is launched from the ramp 30 over the spinning disk surface during a load operation. The control circuitry 22 processes a read signal 32 emanating from the first head $18_1$ in order to synchronize to servo sectors $34_0$-$34_N$. Once synchronized to the servo sectors $34_0$-$34_N$, the control circuitry 22 generates a control signal 36 applied to a voice coil motor (VCM) 38 which rotates an actuator arm 40A about a pivot in order to position the first head $18_1$ over a target data track. Once the head $18_1$ reaches the target data track, the control circuitry 22 controls both the VCM 38 and the first microactuator $20_1$ (over line $42_1$) in order to maintain the first head $18_1$ over the target data track during an access operation (e.g., write/read operation).

In one embodiment, the first head $18_1$ comprises at least one write and read element fabricated on a slider that is coupled to a suspension 44A using a suitable head gimbal assembly (HGA). The suspension 44A, which is coupled to the actuator arm 40A, comprises a flexible material that biases the head toward the disk surface. When the disk surface is spinning at a high speed, an air bearing forms such that the head is said to fly just above the disk surface.

Any suitable microactuator may be employed to actuate the head over the disk surface, such as a piezoelectric actuator. In addition, the microactuator may actuate the head over the disk surface in any suitable manner, such as by actuating the suspension relative to the actuator arm, or by actuating the HGA that couples the slider relative to the suspension.

In one embodiment, manufacturing defects/tolerances in the slider and/or defects/tolerances in the HGA and/or suspension and/or defects/tolerances of the disk and/or clamping of the disk may cause fly height instability of the head during a load operation. That is, when the head is launched off the ramp over the spinning disk surface, manufacturing defects of one or more components, as well as the inherent transient of the load operation may cause the head to exhibit an instable fly height which can damage the head and/or the disk surface due to head/disk contact (touchdown). Accordingly, in one embodiment fly height instability of a head is detected during a load operation so that any suitable corrective action may be taken, such as modifying the state trajectory of the load operation, improving the manufacturing processes, replacing defective components, or disabling a head in a multi-surface disk drive (depopulating a head).

In one embodiment, the control circuitry 22 detects fly height instability of the first head $18_1$ over the first disk surface $16_1$ during a load operation by configuring the first microactuator $20_1$ into a sensor, and monitoring a sensor signal (over line $42_1$) generated by the first microactuator $20_1$ during the load operation. FIG. 2C illustrates an example fly height instability and resulting sensor signal which in this example is a voltage signal that oscillates between a positive and negative value (only the envelope of the oscillations is shown). That is, the fly height oscillations that occur during the fly height instability translate into an oscillating sensor signal, and therefore the instability in the fly height may be detected in one embodiment by evaluating the effect on the sensor signal.

Figure 3A:
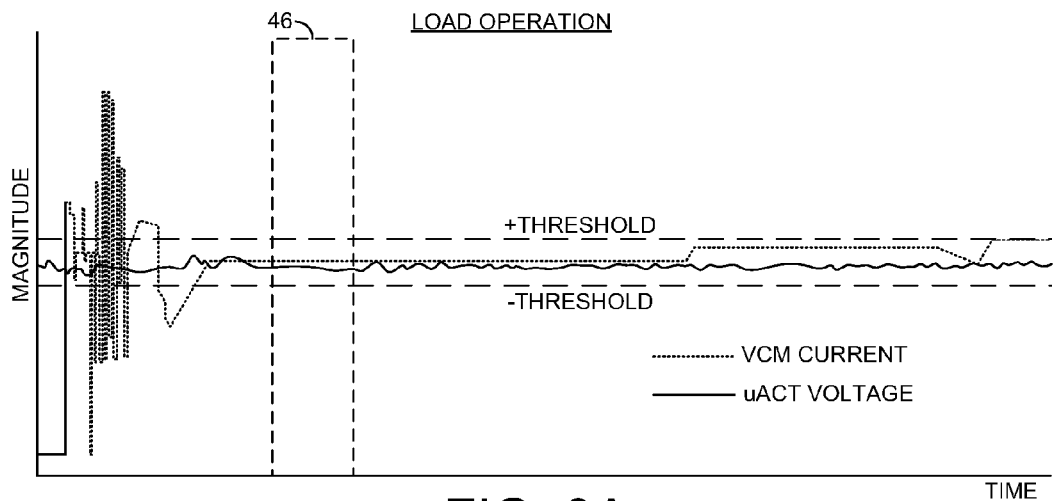
FIG. 3A is a waveform of the microactuator sensor signal illustrating fly height stability during a load operation.
Figure 3B:
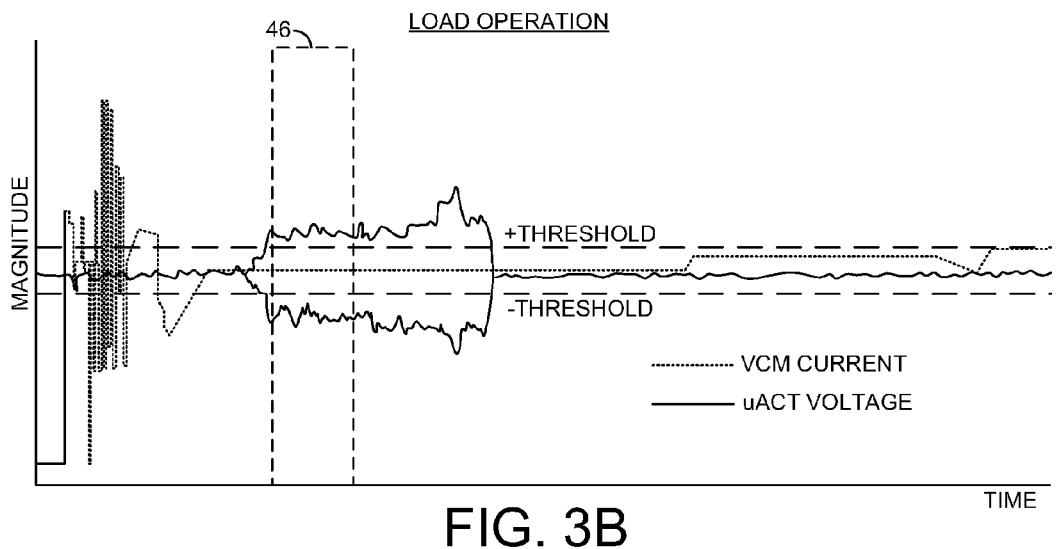
FIG. 3B shows an embodiment wherein the microactuator sensor signal is compared to positive and negative thresholds during a sense window in order to detect fly height instability.

FIGS. 3A and 3B show an embodiment wherein the control circuitry detects the fly height instability of the head based on a magnitude of the sensor signal over a sense window 46 during the load operation, wherein the sense window 46 may correspond to the time that fly height instability will typically occur. FIG. 3A shows an example load operation wherein the fly height is stable and therefore the magnitude of the sensor signal over the sense window 46 does not exceed positive and negative thresholds. FIG. 3B shows an example load operation wherein the fly height is instable (e.g., oscillating) and the resulting oscillations in the sensor signal exceed the positive and negative thresholds. Also in the embodiments of FIGS. 3A and 3B, the sense window 46 is opened when the current flowing through the VCM remains below a threshold for an interval. That is, the sense window 46 may be opened when the VCM current becomes relatively stable such that perturbations in the sensor signal are caused mainly by fly height instability rather than transients in the VCM servo system.

Figure 4A:
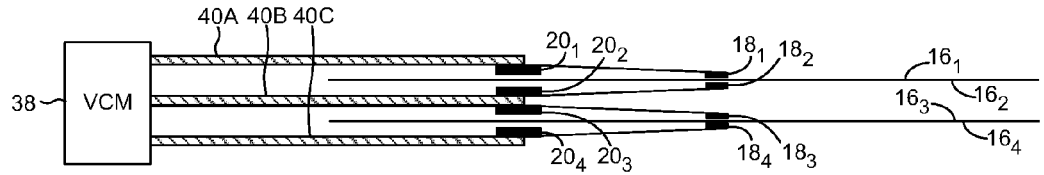
FIG. 4A shows an embodiment wherein the data storage device comprises a plurality of disk surfaces and at least one head actuated over each disk surface by respective microactuators.
Figure 4B:
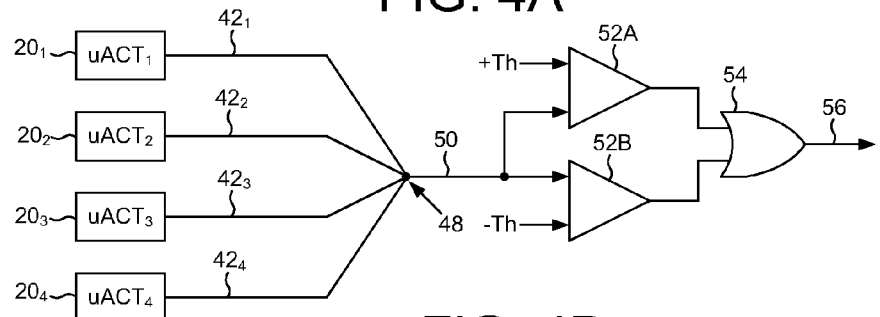
FIG. 4B shows an embodiment wherein the plurality of microactuator sensor signals are wire-ORed and the resulting combined sensor signal compared to positive and negative thresholds to detect fly height instability.

FIG. 4A shows an embodiment of a disk drive comprising a plurality of disk surfaces $16_1$-$16_N$ with at least one head $18_1$-$18_N$ actuated over each disk surface by a respective microactuator $20_1$-$20_N$. FIG. 4B shows an embodiment wherein during a load operation the microactuator sensor signals $42_1$-$42_4$ are wire-ORed 48, and the combined sensor signal 50 compared to positive and negative thresholds at comparators 52A and 52B. The outputs of the comparators are ORed at OR gate 54 such that the resulting signal 56 indicates fly height instability. In one embodiment, the control circuitry 22 configures the microactuator sensor signals $42_1$-$42_4$ into the wire-ORed configuration shown in FIG. 4B during an initial number of load operations while testing for fly height instability. If fly height instability is detected during the initial load operations, the control circuitry 22 may execute at least one additional load operation to evaluate each of the microactuator sensor signals $42_1$-$42_4$ individually in order to identify which of the heads $18_1$-$18_N$ is exhibiting fly height instability.

Figure 4C:
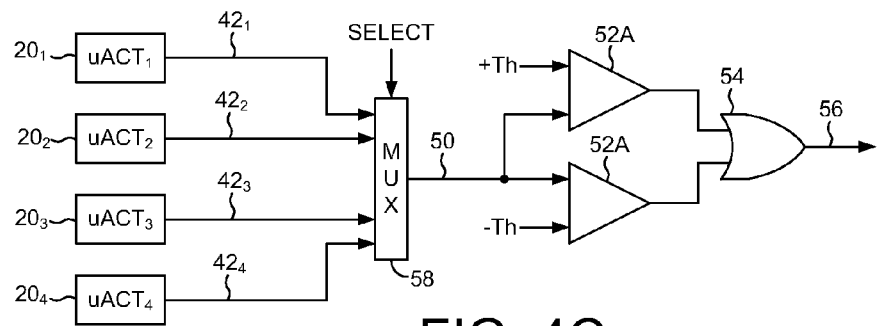
FIG. 4C shows an embodiment wherein the microactuator sensor signals are evaluated individually in order to identify the head that is exhibiting fly height instability during the load operations.

FIG. 4C shows an example of this embodiment wherein the control circuitry 22 may configure a multiplexer 58 to select one of the microactuator sensor signals $42_1$-$42_4$ during a subsequent load operation. The control circuitry 22 may then evaluate the selected sensor signal over the entire sense window 46 shown in FIGS. 3A and 3B. A number of load operations may be executed, wherein a different sensor signal may be selected during each load operation in order to determine which head is exhibiting fly height instability. In one embodiment, after detecting fly height instability when evaluating the combined sensor signal 50 in FIG. 4B, the control circuitry 22 may execute a number of load operations for each head while evaluating the respective sensor signal in order to verify whether a head is exhibiting fly height instability.

Figure 4D:
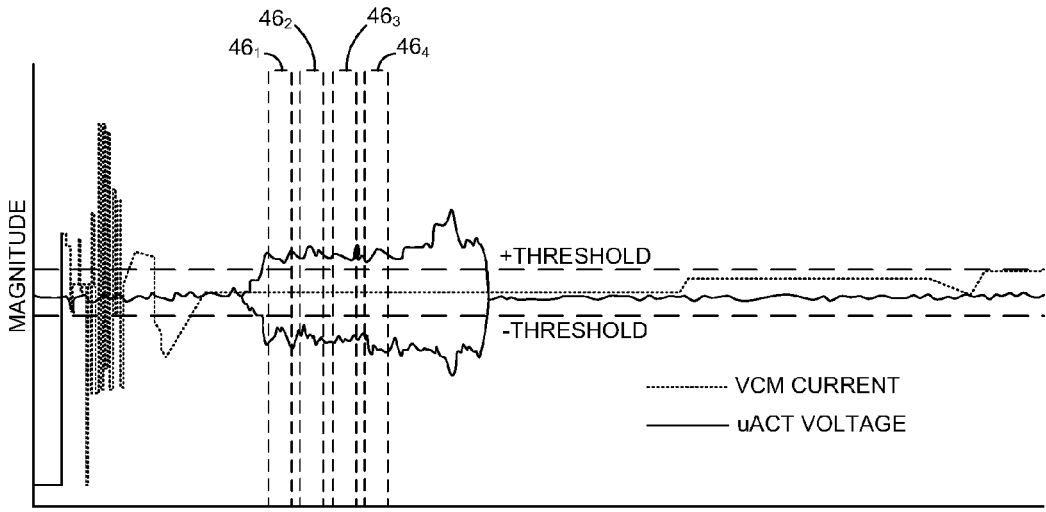
FIG. 4D shows an embodiment wherein each microactuator sensor signal is evaluated over a respective sense window during the load operation.

FIG. 4D shows an embodiment wherein during a load operation, the sense window 46 shown in FIGS. 3A and 3B may be divided into a number of smaller sense windows $46_1$-$46_N$, wherein during each sense window the control circuitry 22 may evaluate a respective one of the microactuator sensor signals $42_1$-$42_4$. In one embodiment, the control circuitry 22 may execute a number of load operations, wherein during each load operation the control circuitry 22 may select a different microactuator sensor signal $42_1$-$42_4$ to evaluate for each sense window so that the control circuitry 22 evaluates each sensor signal over the entire sense window 46. In one embodiment, the control circuitry 22 may employ the smaller sense windows shown in FIG. 4D after detecting a fly height instability while evaluating the combined sensor signal 50 shown in FIG. 4B over the entire sense window 46.

In one embodiment, the control circuitry 22 may evaluate each microactuator sensor signal during each load operation over an even smaller sense window, wherein the sense windows may be time-division multiplexed over the entire sense window 46. That is, during a single load operation the control circuitry 22 may time-division multiplex the microactuator sensor signals $42_1$-$42_4$ over small slices of the sense window 46 such that each microactuator sensor signal $42_1$-$42_4$ is evaluated multiple times over the sense window 46. In one embodiment, the time-division multiplexing technique may be employed after detecting fly height instability while evaluating the combined sensor signal 50 shown in FIG. 4B over the entire sense window 46.

Figure 5A:
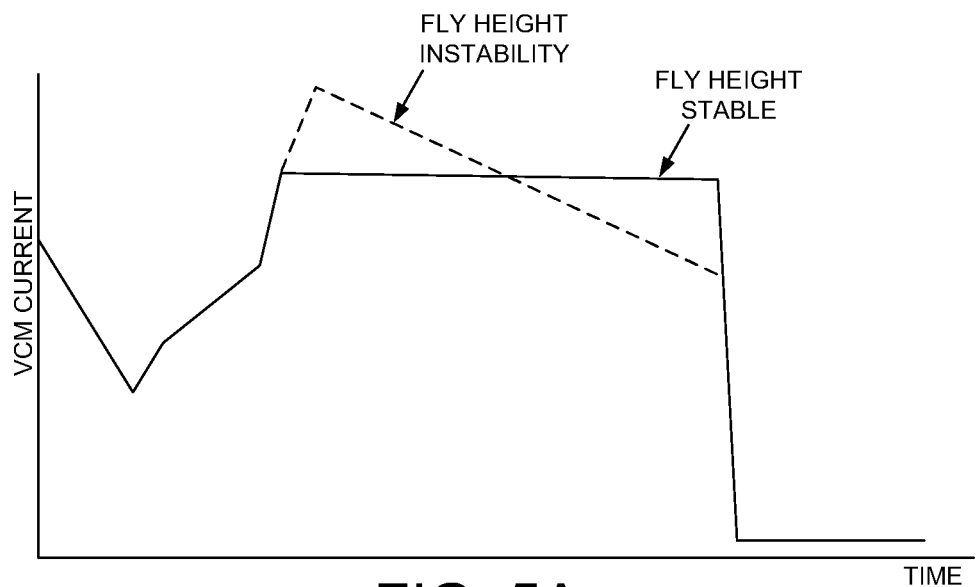
FIG. 5A shows an embodiment wherein the current applied to the VCM during the load operation may be evaluated to verify a fly height instability detected based on the microactuator sensor signal.
Figure 5B:
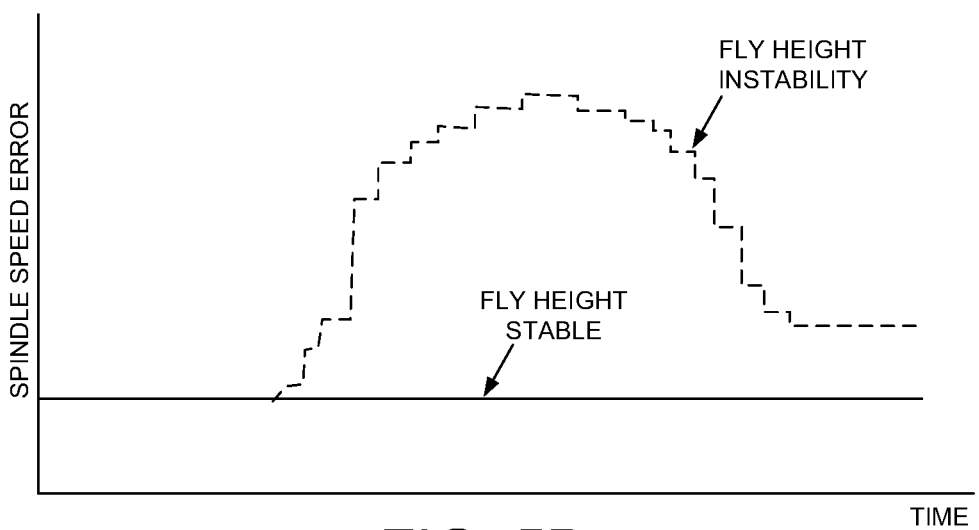
FIG. 5B shows an embodiment wherein a spindle speed error during the load operation may be evaluated to verify a fly height instability detected based on the microactuator sensor signal.

In one embodiment, other signals generated within the data storage device may be evaluated in order to confirm whether fly height instability of a head is actually occurring. FIG. 5A shows an example of this embodiment wherein a current profile of a current flowing through the VCM during the load operations may be evaluated to verify a detected fly height instability. In this example, when the fly height is stable the VCM current may remain fairly constant during the load operation (after the initial transients), whereas when there is fly height instability, the VCM current may exhibit a ramp shape as illustrated in FIG. 5A. FIG. 5B illustrates another example of this embodiment wherein a speed error of a spindle motor (not shown) that rotates the disks during the load operations may be evaluated to verify a detected fly height instability. Other embodiments may evaluate different and/or additional signals to verify a detected fly height instability, such as evaluating a signal generated by an acoustic sensor or a fly height/touchdown sensor. For example, in one embodiment each head $18_1$-$18_N$ may be fabricated with a temperature sensitive proximity sensor (e.g., fly height sensor, touchdown sensor, etc.) that may be evaluated during load operations in addition to the microactuator sensor signals $42_1$-$42_4$ in order to verify a detected fly height instability.

Figure 6A:
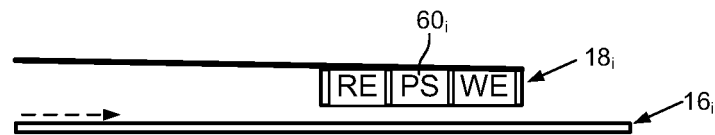
FIG. 6A shows an embodiment wherein each head may comprise a suitable proximity sensor (e.g., fly height sensor, touchdown sensor, etc.).

FIG. 6A shows an embodiment wherein each head $18_i$ may comprise a suitable write element (WE), a suitable read element (RE), and a suitable proximity sensor (PS) $60_i$ (e.g., fly height sensor, touchdown sensor, etc.) capable of detecting a proximity of the head $18_i$ to the disk surface $16_i$. In one embodiment, the control circuitry 22 may be capable of evaluating the sensor signal generated by one of the proximity sensors from a selected one of the heads. For example, the control circuitry 22 may comprise a preamp circuit capable of selecting one of the proximity sensor signals in order to evaluate the proximity of the corresponding head to the corresponding disk surface. Accordingly, in one embodiment during a first load operation the microactuator sensor signals $42_1$-$42_4$ may be evaluated as a combined wire-ORed signal 50 as shown in FIG. 4B in order to detect a fly height instability of any one of the heads (global detection). When the global fly height instability is detected, the control circuitry 22 may execute a number of subsequent load operations wherein each of the proximity sensor signals may be evaluated individually in order to determine which of the heads is exhibiting the fly instability (local detection).

Figure 6B:
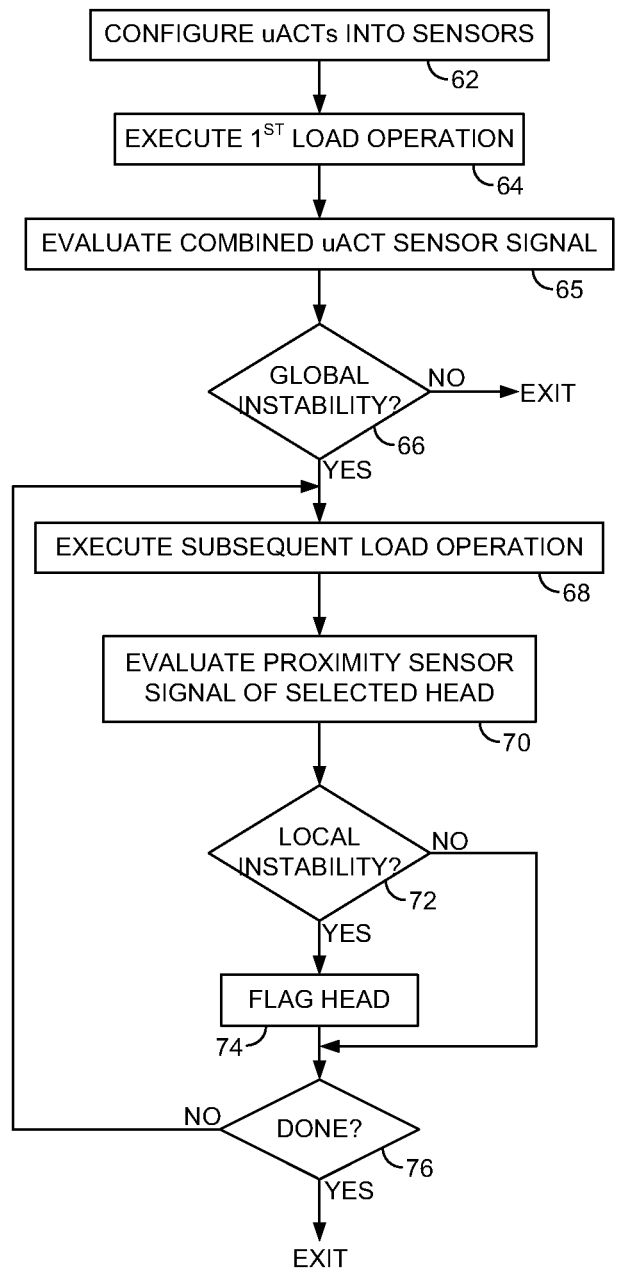
FIG. 6B is a flow diagram according to an embodiment wherein the microactuator sensor signals are first evaluated to detect fly height instability of any one of the heads (global detection), and when fly height instability is detected, the proximity sensor signal of a selected head is evaluated during subsequent load operations to detect which head is exhibiting the fly height instability (local detection).

This embodiment is understood with reference to the flow diagram of FIG. 6B wherein the plurality of microactuators are configured into sensors (block 62) and a first load operation is executed (block 64). The combined microactuator sensor signal is evaluated (block 65) during the first load operation to detect a fly height instability of at least one of the heads (global detection), and when fly height instability is detected (block 66), the control circuitry executes a subsequent load operation (block 68) and evaluates the proximity sensor signal generated for a selected head (block 70). When the proximity sensor signal indicates fly height instability (block 72), the selected head is flagged (block 74). Subsequent load operations may be executed (block 76) in order to evaluate the proximity sensor signal for each head individually, thereby detecting a local fly height instability for each head after detecting a fly height instability globally based on the combined microactuator sensor signal.

The threshold(s) used to detect the fly height instability, such as the thresholds shown in the embodiments of FIGS. 3A and 3B, may be configured to any suitable level. In one embodiment, the threshold(s) may be pre-set, and in another embodiment, the threshold(s) may be configured before a load operation while the head is parked on the ramp. For example, in one embodiment the microactuator sensor signal may be evaluated to obtain a measure of the noise level in real time, and the threshold(s) for the corresponding head configured accordingly. In one embodiment, the threshold(s) may also be adjusted relative to environmental condition(s), such as the operating temperature.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a first disk surface;
   a first head;
   a first microactuator configured to actuate the first head over the first disk surface;
   a second disk surface;
   a second head;
   a second microactuator configured to actuate the second head over the second disk surface; and
   control circuitry configured to:
      configure the first microactuator into a first sensor;
      configure the second microactuator into a second sensor;
      execute a first load operation to load the first head over the first disk surface and to load the second head over the second disk surface;
      detect a fly height instability of at least one of the first head and the second head during the first load operation based on a first sensor signal generated by the first microactuator and based on a second sensor signal generated by the second microactuator;
      wire-OR the first sensor signal and the second sensor signal to generate a combined sensor signal; and
      detect the fly height instability of at least one of the first head and the second head based on the combined sensor signal.

2. The data storage device as recited in claim 1, wherein the control circuitry is further configured to detect the fly height instability of the head based on a magnitude of the first sensor signal over a sense window during the load operation.

3. The data storage device as recited in claim 2, further comprising a voice coil motor (VCM) configured to actuate the first head over the first disk surface, wherein the control circuitry is further configured to open the sense window based on a current flowing through the VCM during the first load operation.

4. The data storage device as recited in claim 3, wherein the control circuitry is further configured to open the sense window when the current flowing through the VCM remains below a threshold for an interval.

5. The data storage device as recited in claim 1, wherein when the fly height instability of the first or second head is detected during the first load operation, the control circuitry is further configured to execute at least one additional load operation to evaluate each of the first and second sensor signals individually.

6. The data storage device as recited in claim 5, wherein the control circuitry is further configured to:
   monitor the first sensor signal individually during a second load operation to evaluate the fly height instability of the first head; and
   monitor the second sensor signal individually during a third load operation to evaluate the fly height instability of the second head.

7. The data storage device as recited in claim 5, wherein during a second load operation the control circuitry is further configured to:
   monitor the first sensor signal individually over a first sense window to evaluate the fly height instability of the first head; and
   monitor the second sensor signal individually over a second sense window to evaluate the fly height instability of the second head.

8. The data storage device as recited in claim 7, wherein the control circuitry is further configured to time-division multiplex a plurality of windows between the first and second sensor signals in order to evaluate the fly height instability of the first and second heads.

9. The data storage device as recited in claim 7, wherein the control circuitry is further configured to evaluate the combined sensor signal during the first load operation over a third sense window longer than the first and second sense windows.

10. The data storage device as recited in claim 1, further comprising a voice coil motor (VCM) configured to actuate the first head over the first disk surface, wherein the control circuitry is further configured to evaluate a current profile of a current flowing through the VCM during the first load operation to verify the detected fly height instability.

11. The data storage device as recited in claim 1, further comprising a spindle motor configured to rotate the first disk surface, wherein the control circuitry is further configured to evaluate a speed error of the spindle motor during the first load operation to verify the detected fly height instability.

12. The data storage device as recited in claim 1, wherein the first head comprises a first proximity sensor, the second head comprises a second proximity sensor, and
   the control circuitry is further configured to:
      execute the first load operation to load the second head over the second disk surface;
      detect a fly height instability of at least one of the first head and the second head during the first load operation based on the first sensor signal generated by the first microactuator and the second sensor signal generated by the second microactuator; and
      when the fly height instability is detected:
         monitor a third sensor signal generated by the first proximity sensor during a second load operation to evaluate the fly height instability of the first head; and
         monitor a fourth sensor signal generated by the second proximity sensor during a third load operation to evaluate the fly height instability of the second head.

13. A method of operating a data storage device, the method comprising:
   configuring a first microactuator into a first sensor;
   configuring a second microactuator into a second sensor;
   executing a first load operation to load a first head over a first disk surface and to load a second head over a second disk surface;
   detecting a fly height instability of at least one of the first head and the second head during the first load operation based on a first sensor signal generated by the first microactuator and based on a second sensor signal generated by the second microactuator;
   wire-ORing the first sensor signal and the second sensor signal to generate a combined sensor signal; and
   detecting the fly height instability of at least one of the first head and the second head based on the combined sensor signal.

14. The method as recited in claim 13, further comprising detecting the fly height instability of the head based on a magnitude of the first sensor signal over a sense window during the load operation.

15. The method as recited in claim 14, further comprising opening the sense window based on a current flowing through a voice coil motor (VCM) during the first load operation.

16. The method as recited in claim 15, further comprising opening the sense window when the current flowing through the VCM remains below a threshold for an interval.

17. The method as recited in claim 13, wherein when the fly height instability of the first or second head is detected during the first load operation, further comprising executing at least one additional load operation to evaluate each of the first and second sensor signals individually.

18. The method recited in claim 17, further comprising:
monitoring the first sensor signal individually during a second load operation to evaluate the fly height instability of the first head; and
monitoring the second sensor signal individually during a third load operation to evaluate the fly height instability of the second head.

19. The method as recited in claim 17, wherein during a second load operation the method further comprises:
monitoring the first sensor signal individually over a first sense window to evaluate the fly height instability of the first head; and
monitoring the second sensor signal individually over a second sense window to evaluate the fly height instability of the second head.

20. The method as recited in claim 19, further comprising time-division multiplexing a plurality of windows between the first and second sensor signals in order to evaluate the fly height instability of the first and second heads.

21. The method as recited in claim 19, further comprising evaluating the combined sensor signal during the first load operation over a third sense window longer than the first and second sense windows.

22. The method as recited in claim 13, further comprising evaluating a current profile of a current flowing through a voice coil motor (VCM) configured to actuate the first head over the first disk surface during the first load operation to verify the detected fly height instability.

23. The method as recited in claim 13, further comprising evaluating a speed error of a spindle motor configured to rotate the first disk surface during the first load operation to verify the detected fly height instability.

24. The method as recited in claim 13, further comprising:
executing the first load operation to load the second head over the second disk surface;
detecting a fly height instability of at least one of the first head and the second head during the first load operation based on the first sensor signal and the second sensor signal generated by the second microactuator; and
when the fly height instability is detected:
monitoring a third sensor signal generated by a first proximity sensor of the first head during a second load operation to evaluate the fly height instability of the first head; and
monitoring a fourth sensor signal generated by a second proximity sensor of the second head during a third load operation to evaluate the fly height instability of the second head.

25. A data storage device comprising:
a first disk surface;
a first head;
a voice coil motor (VCM) and a first microactuator configured to actuate the first head over the first disk surface; and
control circuitry configured to:
configure the first microactuator into a first sensor;
execute a first load operation to load the first head over the first disk surface;
detect a fly height instability of the first head during the first load operation based on a magnitude of a first sensor signal generated by the first microactuator over a sense window during the load operation; and
open the sense window based on a current flowing through the VCM during the first load operation.

26. The data storage device as recited in claim 25, wherein the control circuitry is further configured to open the sense window when the current flowing through the VCM remains below a threshold for an interval.

27. A data storage device comprising:
a first disk surface;
a first head;
a voice coil motor (VCM) and a first microactuator configured to actuate the first head over the first disk surface; and
control circuitry configured to:
configure the first microactuator into a first sensor;
execute a first load operation to load the first head over the first disk surface;
detect a fly height instability of the first head during the first load operation based on a first sensor signal generated by the first microactuator; and
evaluate a current profile of a current flowing through the VCM during the first load operation to verify the detected fly height instability.

28. A data storage device comprising:
a first disk surface;
a first head;
a first microactuator configured to actuate the first head over the first disk surface;
a spindle motor configured to rotate the first disk surface; and
control circuitry configured to:
configure the first microactuator into a first sensor;
execute a first load operation to load the first head over the first disk surface;
detect a fly height instability of the first head during the first load operation based on a first sensor signal generated by the first microactuator; and
evaluate a speed error of the spindle motor during the first load operation to verify the detected fly height instability.

29. A data storage device comprising:
a first disk surface;
a first head comprising a first proximity sensor;
a first microactuator configured to actuate the first head over the first disk surface;
a second disk surface;
a second head comprising a second proximity sensor;
a second microactuator configured to actuate the second head over the second disk surface; and
control circuitry configured to:
configure the first microactuator into a first sensor;
configure the second microactuator into a second sensor;
execute a first load operation to load the first head over the first disk surface and to load the second head over the second disk surface;
detect a fly height instability of at least one of the first head and the second head during the first load operation based on a first sensor signal generated by the first microactuator and a second sensor signal generated by the second microactuator;
when the fly height instability is detected:
monitor a third sensor signal generated by the first proximity sensor during a second load operation to evaluate the fly height instability of the first head; and
monitor a fourth sensor signal generated by the second proximity sensor during a third load operation to evaluate the fly height instability of the second head.

30. A method of operating a data storage device, the method comprising:
- configuring a first microactuator into a first sensor;
- executing a first load operation to load a first head over a first disk surface;
- detecting a fly height instability of the first head during the first load operation based on a magnitude of a first sensor signal generated by the first microactuator over a sense window during the load operation; and
- opening the sense window based on a current flowing through a voice coil motor (VCM) during the first load operation.

31. The method as recited in claim 30, further comprising opening the sense window when the current flowing through the VCM remains below a threshold for an interval.

32. A method of operating a data storage device, the method comprising:
- configuring a first microactuator into a first sensor;
- executing a first load operation to load a first head over a first disk surface;
- detecting a fly height instability of the first head during the first load operation based on a first sensor signal generated by the first microactuator; and
- evaluating a current profile of a current flowing through a voice coil motor (VCM) during the first load operation to verify the detected fly height instability.

33. A method of operating a data storage device, the method comprising:
- configuring a first microactuator into a first sensor;
- executing a first load operation to load a first head over a first disk surface;
- detecting a fly height instability of the first head during the first load operation based on a first sensor signal generated by the first microactuator; and
- evaluating a speed error of a spindle motor during the first load operation to verify the detected fly height instability.

34. A method of operating a data storage device, the method comprising:
- configuring a first microactuator into a first sensor;
- configuring a second microactuator into a second sensor;
- executing a first load operation to load a first head over a first disk surface and to load a second head over a second disk surface;
- detecting a fly height instability of at least one of the first head and the second head during the first load operation based on a first sensor signal generated by the first microactuator and a second sensor signal generated by the second microactuator;
- when the fly height instability is detected:
  - monitoring a third sensor signal generated by a first proximity sensor of the first head during a second load operation to evaluate the fly height instability of the first head; and
  - monitoring a fourth sensor signal generated by a second proximity sensor of the second head during a third load operation to evaluate the fly height instability of the second head.

* * * * *